July 28, 1959
L. LERICK
2,896,494
ANCHOR BOLT WITH NUT ACTUATED EXPANSION WEDGES
Filed Aug. 2, 1956
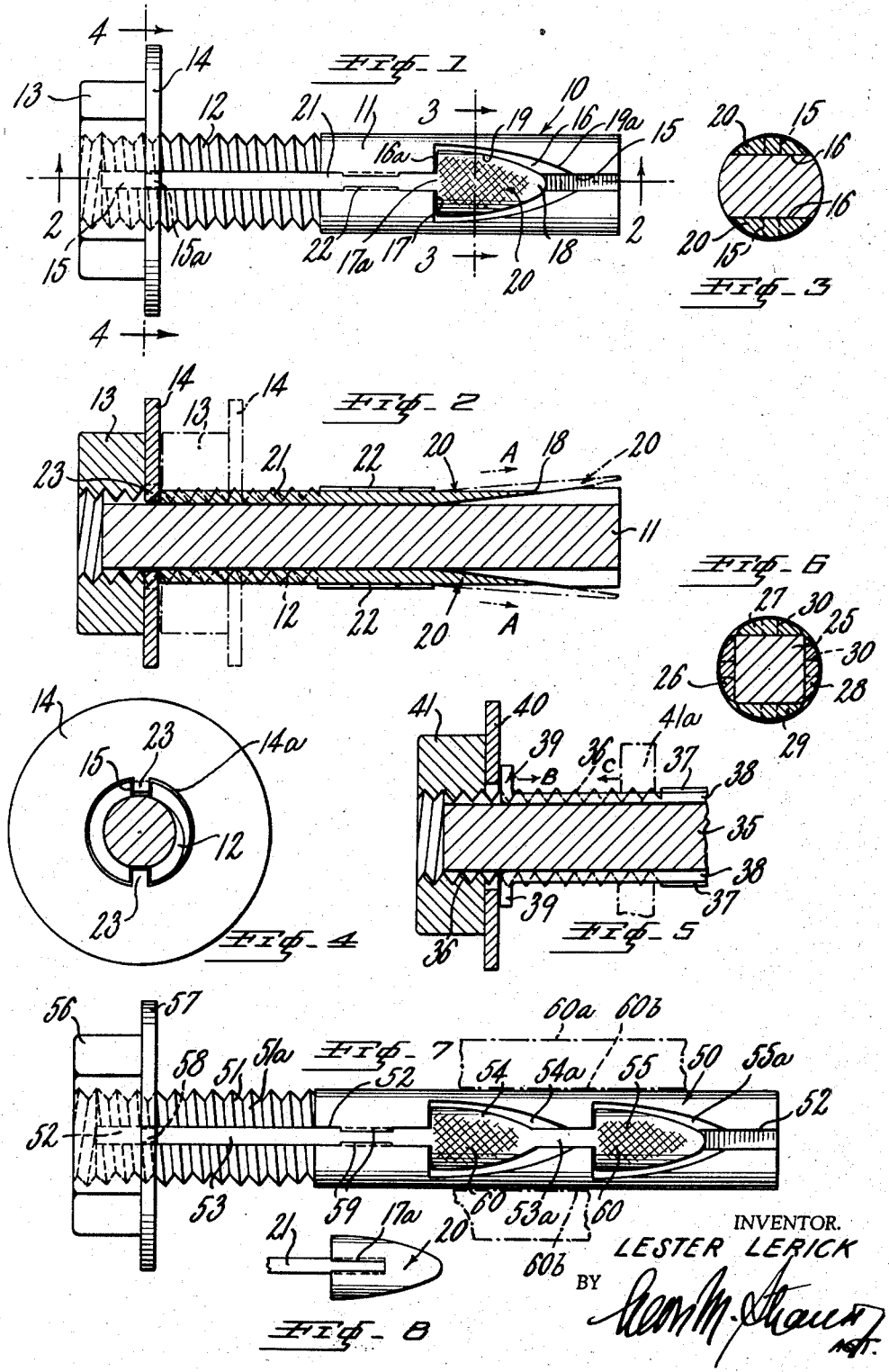
INVENTOR.
LESTER LERICK United States Patent Office 2,896,494
Patented July 28, 1959

2,896,494
ANCHOR BOLT WITH NUT ACTUATED EXPANSION WEDGES

Lester Lerick, White Plains, N.Y.

Application August 2, 1956, Serial No. 601,699

3 Claims. (Cl. 85—2.4)

This invention relates to expansion devices, and more particularly to expansion and like fastening elements.

It is an important object of the invention to provide means enabling the anchorage of a fastening element by means of its expansion bolt portion in an opening of a wall while a threaded portion of said fastening element controls the expansion action of said bolt portion and may simultaneously serve to fix in position a structural part with respect to said wall.

It is a further object of the invention to provide means facilitating the insertion of an expansion element of the aforesaid type into an opening of a carrier, wall or the like, whereby the diameter of said opening may correspond to the diameter of the expansion portion of said element, the expansion operation of said element being carried out in a very efficient and economical manner, and substantially without weakening the expansion element.

It is a further object of the present invention to provide means affording the tightening and fixation of the expansion element in operative position commensurate with an interior linear pressure exerted to cause outward displacement of expansion means of said expansion element.

It is a further object of the present invention to provide means conducive to the formation of expansion means out of the material of the expansion element, in particular of the bolt portion of the latter and the retention of said expansion means of said expansion element when in inoperative position during storage and transportation.

A still further object of the present invention is to provide means rebounding to stepwise increasing expansion effects due to predetermined formation of said expansion means and their relative position relative to the circumference of the expansion element.

The above and other objects of the invention will become further apparent from the following detailed description, reference being made to the accompanying drawing, showing preferred embodiments of the invention.

In the drawing:

Fig. 1 is a top plan view of an expansion element equipped with expansion means embodying the invention, said expansion means being shown in an inoperative position.

Fig. 2 is a cross-sectional view of the expansion element of Fig. 1, the section being taken along lines 2—2 of Fig. 1.

Fig. 3 is a cross-sectional view taken along lines 3—3 of Fig. 1.

Fig. 4 is a sectional view taken along lines 4—4 of Fig. 1.

Fig. 5 shows in section a portion of an expansion element in modified form.

Fig. 6 is a cross-sectional view of the expansion element seen in Fig. 5.

Fig. 7 shows a top plan view of an expansion element equipped with expansion means in tandem relation representing a further modification of the invention.

Fig. 8 is a fragmentary top plan view of one of the expansion means as swedged to a holder.

Referring now more particularly to the drawing, there is disclosed an expansion bolt device 10, having the bolt proper 11, threaded portion 12 and a nut 13 movable on the threaded bolt portion 12. Between nut 13 and bolt 11, there is positioned a washer 14 which may form an integral part of nut 13 or may be separate therefrom.

Device 10 is provided with two oppositely arranged grooves 15 extending the entire length of said device. Bolt 11 has two recesses 16, each of which has a base 16a through which groove 15 extends. The material cut away from bolt 11 at each recess 16 forms a slide for key-shaped expansion means 20 which has a relatively thick base 17 and a relatively thin pointed end 18. As can be further seen from Fig. 1, the circumference 19 of key-shaped slide 20 is reduced with respect to the recess or cutout 16 bounded by end edge 19a. To base 17 of each slide 20 is connected a guide rod 21 movable in lengthwise direction of groove or slot 15. This rod 21 may be either round or polygonal-shaped and the free end of rod 21 is preferably swaged at 17a to slide 20.

In accordance with Fig. 1, the upper edges of groove 15 in which guide rod 21 is inserted, have been somewhat displaced or compressed at 22 in order to retain rod 21 in engagement with groove 15. Normally slide 20 abuts against the base or end wall 16a from where said slide may be advanced to a position in accordance with arrows A and indicated in dotted lines in Fig. 2.

In order to uniformly advance wedge-shaped slides 20 forming expansion means, beyond the outer surface or circumference of bolt portion 11, the latter after having been inserted in the opening of a wall (not shown) is secured by said wall opening operating nut 13 along the threaded portion 12. Due to this action washer 14 whose inturned noses 23 at central opening 14a engage the free ends 15a of the rods 15 and presses the latter forwardly in said guide grooves or slots 15 and in the direction of arrows A, as may be readily realized from Fig. 2.

Fig. 6 shows a square-shaped bolt 25 with four expansion slides 26, 27, 28 and 29, which are moved in the same manner as hereinabove stated by means of rods 30 connected to the aforementioned slides or expansion means.

Fig. 5 shows bolt portion 35 and threaded portion 36 through which extend diametrically disposed grooves 37 in which are positioned guide rods 38 terminating in angularly bent ends 39 adapted to engage with washer 40 which is displaceable in the direction of arrow B by means of nut 41 when same is moved along threaded portion 36. In this particular case, the noses 23 mentioned with respect to washer 14 may be dispensed with, the bent rod ends 39 abutting directly and exteriorly against the adjacent surface of washer 40.

After rods 38 have been advanced in direction B to thereby bring expansion means (not shown) into operative position in a manner as explained with respect to Fig. 2 and if it is then desired to again retract said expansion means, a counter- or check-nut 41a (indicated in dotted lines) may be actuated on threaded portion 36 to abut against rod ends 39 and to cause sliding of rods 38 together with said expansion means in the direction C which are moved to disengaged or inoperative position, as is well understood.

Fig. 7 shows a further modified form of the invention having a bolt portion 50 of predetermined length and having a threaded portion 51. Through both portions 50 and 51 extend in diametrically opposed relation grooves 52 in which are received guide rods 53 to which are connected respective slidable expansion means 54 and 55 in tandem relation, to thereby exert a stepwise and increasing expansion pressure.

Slides 54 and 55 have been obtained in a manner similar to slide 20 by cutting off material from bolt portion 50 to create corresponding recesses 54a and 55a.

Guide rods 53 are displaceable in and along grooves 52 by means of washer 57 having inner projections or tits 58 similar to the noses 23 of washer 14 in Fig. 4. It is well understood that the central opening of washer 57, like washer 14 has an opening 14a, clears the threads 51a of the threaded portion 51 when pushed thereover due to the engagement of nut 56 with said threads 51a.

Guide rods 53 are retained in grooves 52 (only one guide rod 53 and one groove 52 being shown in Fig. 7) by the pinched upper ends 59 of upright walls which define grooves 52. Rods 53 have been inserted in the respective grooves 52 prior to such pinching action.

In the embodiment shown in Fig. 7 the wedge- or key-shaped expansion means 54, 55 are arranged in tandem relation to each other and are interconnected by an intermediate rod portion 53a. The top surface of said expansion means 54, 55 is roughened or suitably knurled at 60 (similar to the surface of expansion means 20 as seen) to thereby grippingly and wedgingly engage the wall 60a of an opening 60b into which bolt portion 50 may be tightly inserted for anchoring purposes, as said expansion means rest in retracted position normally in said recesses 54a, 55a and do not protrude beyond the circumference of said bolt portion 50. It is well understood that the length of the bolt portion, the length of the threaded portion 51 and the extent of displacement of the expansion means and guide rods therefor are so calculated that a strong anchorage of the fastener element may be achieved.

It can thus be seen, that there has been provided according to this invention an expansion element comprising a bolt portion, a threaded extension portion on said bolt portion, said bolt portion being provided with at least two wedge-shaped, elongated recesses located diametrically opposed in and below the circumference of said bolt portion, said bolt portion and said threaded extension portion being provided with respective elongated grooves extending through said wedge-shaped recesses and said bolt portion and said threaded extension portion, wedge-shaped expansion means including guide rods having free ends, said expansion means being shaped to fill out said recesses, while said guide rods engage said grooves, and means for advancing along said threaded extension portion and abutting the free ends of said guide rods to threreby displace said expansion means lengthwise of said bolt portion and beyond the circumference of the latter for gripping engagement with a wall defining an opening, in which said bolt portion may be located.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A bolt assembly comprising a bolt portion, a threaded extension portion of substantially the same diameter as said bolt portion and connected to said bolt portion, said bolt portion being provided with at least two wedge-shaped recesses having walls defining said recesses sloping inwardly and forwardly and located diametrically opposed to each other below the surface of said bolt portion, said bolt portion and said threaded extension portion being provided with respective grooves extending parallel to the axis and extending the entire length of said bolt portion, said recesses being respectively located spaced from the ends of said grooves and communicating with said grooves and being greater in width than that of said grooves, wedge-shaped expansion means of a shape complementary to the shape of said recesses and fitted in said recesses, whereby said expansion means are normally flush with the diameter of said bolt portion, said expansion means each having a substantially enlarged rear end wall extending in transverse direction to and beyond the respective groove, each expansion means terminating opposite said enlarged wall in a substantially pointed forward end corresponding approximately to the width of the respective groove, guide rods arranged for movement, respectively, in said grooves and operatively connected with said expansion means whereby said guide rods may be displaced lengthwise of said grooves of said bolt portion thereby projecting at least said pointed ends of said expansion means beyond said recesses and away from the circumference of the bolt portion for gripping engagement with a wall defining an opening in which said bolt portion may be located for anchorage, a washer freely movable over said threaded extension portion and having inturned noses in alignment with and extending into said grooves, said guide rods having ends constructed for actuation and being engaged by said noses of said washer, said washer when advanced over said threaded portion being adapted to move said guide rods in said grooves and said expansion means from said recesses to a position beyond said circumference of said bolt portion, and means threadedly engaged with said threaded extension portion and abutting said washer to move the latter.

2. An assembly according to claim 1, including an additional pair of wedge-shaped recesses located diametrically opposite to each other and respectively in line with and axially displaced from said first-mentioned wedge-shaped recesses, and an additional pair of wedge-shaped expansion means respectively located in said additional recesses and connected to said guide rods, respectively, so that two pairs of expansion means in tandem relation are provided, said pairs of expansion means being located intermediate the respective ends of said grooves.

3. An assembly according to claim 1, wherein each of said expansion means are provided with a roughened top.

References Cited in the file of this patent

UNITED STATES PATENTS

| | | |
|---|---|---|
| 798,440 | McNulty | Aug. 29, 1905 |
| 1,396,398 | Bowman | Nov. 8, 1921 |
| 2,560,525 | Nyl | July 10, 1951 |
| 2,647,431 | Lewis | Aug. 4, 1953 |

FOREIGN PATENTS

| | | |
|---|---|---|
| 492,607 | Great Britain | Sept. 22, 1938 |